United States Patent Office 2,931,994
Patented Apr. 5, 1960

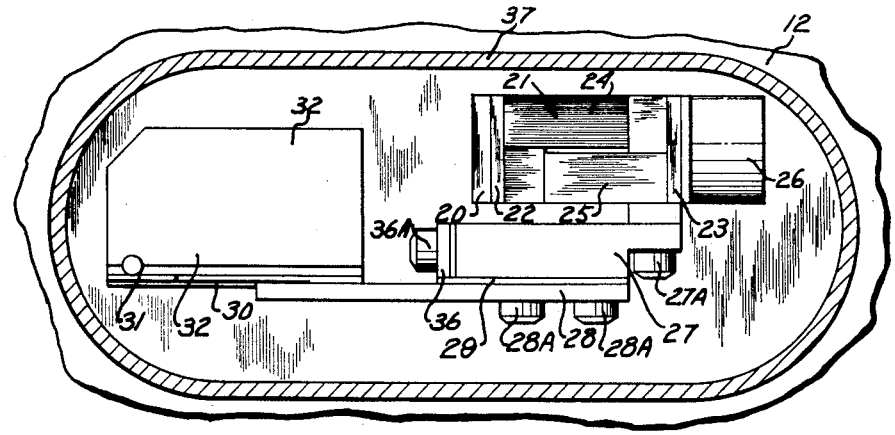
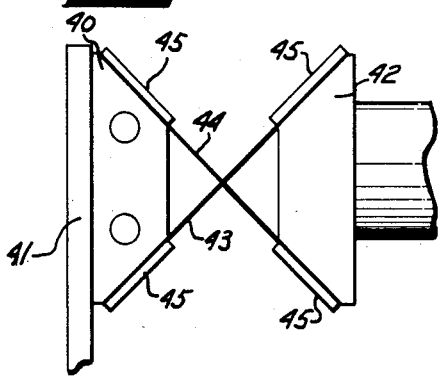
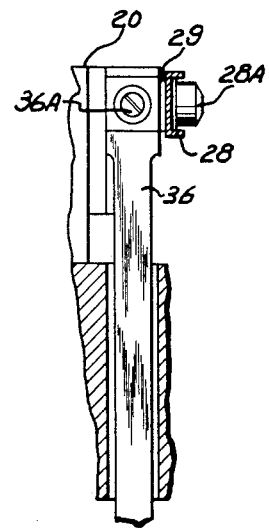
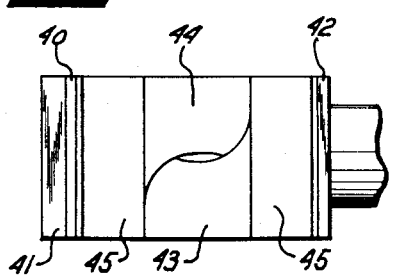
INVENTOR.
JOSEPH P. GIBBS

2,931,994
TRANSDUCER

Joseph P. Gibbs, Arcadia, Calif., assignor to Consolidated Electrodynamics Corporation, Pasadena, Calif., a corporation of California Application July 7, 1958, Serial No. 746,718

6 Claims. (Cl. 338—41)

This invention relates to the measurement of forces and particularly to a pressure transducer in which the effects of vibrational and accelerational environments are minimized.

In a pressure transducer, a transduction system is provided whereby pressure-induced mechanical deflections of a pressure responsive element are transmitted to a displacement sensing device from which an electrical output is produced responsive to the magnitude of the pressure-induced deflections. An electrical output can be recorded to provide a measure of the pressure variations or it can be used to actuate a compensating adjustment where, as in control applications, a compensating response is required as a function of variations in pressure.

In many systems employing pressure transducers as, for example, those utilized in aircraft and missiles, it is particularly important that the pressure transducer exhibit minimum response to vibrational and accelerational environments. Furthermore, this insensitivity to spurious environments must be achieved consistent with minimum size and weight and maximum simplicity of the pressure transducer.

The present invention provides a pressure transducer in which the parameters of size, weight and simplicity are made optimum while a minimum response to vibration and acceleration is achieved. The present invention is a pressure sensing transducer including a housing, pressure responsive means mounted in the housing for displacement in response to pressure changes, and displacement sensing means. A lever arm is maintained in displaceable relationship relative to the displacement sensing means and is associated with means operable to transmit a force to it responsive to displacements of the pressure responsive means. A pair of crossing springs, connected at one end to rigid support means and at their opposite end to the lever arm, suspends the arm for pivoted movement in opposition to the supporting springs. A balancing mass is mounted at the pivoted end of the lever arm.

The pair of crossing springs constitutes a cross-flexure on which the lever arm is pivoted. The cross-flexure suspends the lever arm so that a minimum response to acceleration and vibration is attained. In addition, the cross-flexure minimizes errors of hysteresis and friction and allows a high degree of linearity between pressure-induced displacements of the pressure responsive means and the sweep of the lever arm.

A potentiometric system is particularly useful as a displacement sensing means in the pressure transducer of the present invention since a potentiometric system provides a high level electrical output without the need of impedance matching or signal amplifying equipment. Therefore, while other suitable displacement sensing means may be adapted for use, as, for example, a differential transformer, the transducer of the present invention is described as utilizing a potentiometric system in combination with the pressure responsive means. A pressure transducer having minimum size and weight and maximum simplicity is thereby obtained.

The transducer according to the present invention as well as its advantages and manner of use will be better understood from the following detailed description thereof made in conjunction with the accompanying drawings in which:

Fig. 2 is a fragmentary plan view generally taken along lines 2—2 of Fig. 1;

Fig. 3 is a fragmentary view generally taken along line 3—3 of Fig. 1;

Fig. 4 is a fragmentary elevation of another embodiment of a cross-flexure for use in the transducer according to the invention; and Fig. 5 is a plan view of the embodiment of the cross-flexure shown in Fig. 4.

Figure 1:
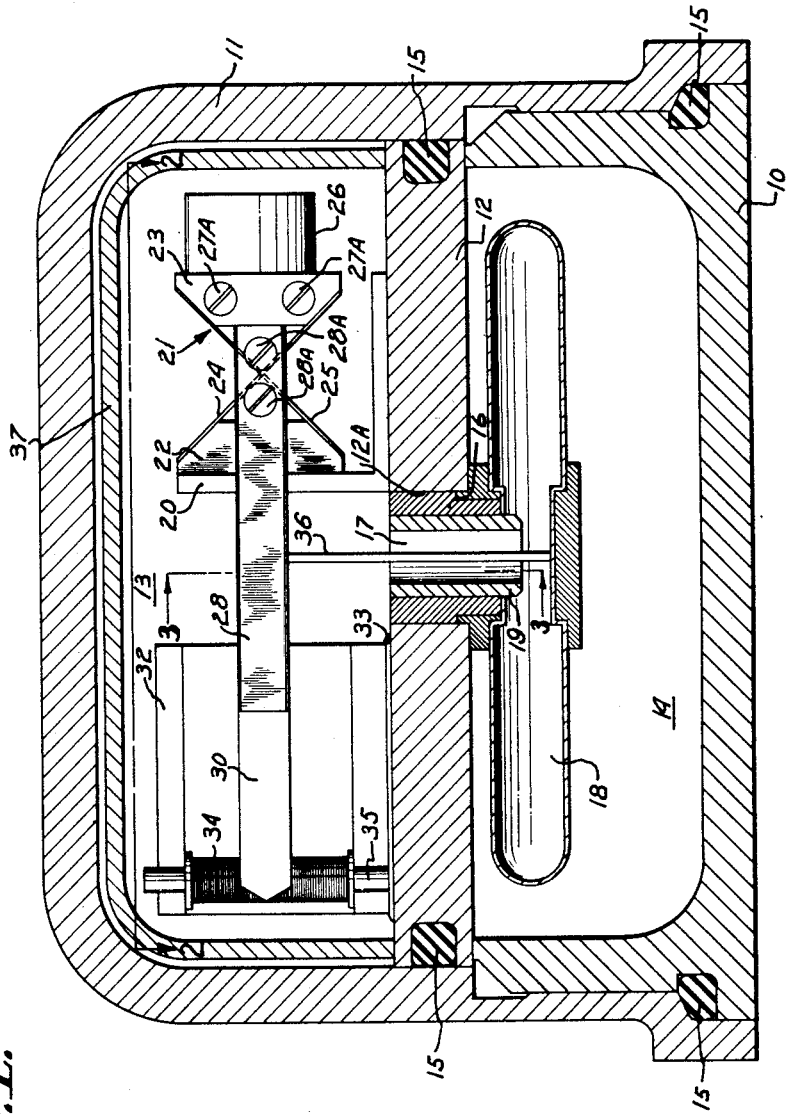
Fig. 1 is a sectional elevation of an embodiment of the transducer according to the invention.

With reference to Figs. 1, 2 and 3 a cylindrical base 10 having a hollowed-out interior section is joined as by threads to a cylindrical outer housing 11. The housing also defines a hollowed-out interior. A cylindrical mounting plate 12 having an outside diameter substantially equal to the inside diameter of the housing is supported on a portion of the base to subdivide the enclosure formed between the base and the housing into a housing enclosure 13 between one side of the mounting plate and the inside surface of the housing and a base enclosure 14 between the other side of the mounting plate and the inside surface of the base. Each of these enclosures is made fluid tight by means of O rings 15 disposed between the periphery of the mounting plate and the housing and between the base and the housing respectively. A pressure connection (not shown) is fitted through the wall of the housing and through a passage (not shown) in the mounting plate to provide pressure communication between the base enclosure and an external source of pressure.

A connector 16 is fitted within an axial bore 12A in the center of the mounting plate so as to form a seal between its exterior and the wall of the mounting plate. The connector is a fitting having a central longitudinal bore 17. A pressure responsive capsule 18, disposed within the base enclosure, is joined to an end of the connector projecting from one side of the mounting plate. The capsule is of the type well-known to the art and comprises a shell formed of a material deformable responsive to pressure variations. The capsule is joined to the connector so that its interior is sealed from the base enclosure but is in flow communication with the housing enclosure through the central bore in the connector. An overstop screw 19 is fitted within the connector bore and projects partially into the interior of the capsule. The overstop screw prevents stressing of the capsule beyond its elastic limit by limiting deflection of the capsule to a maximum value.

Within the housing enclosure an L-shaped bracket 20 is rigidly joined to the face of the mounting plate adjacent to the point where the connector opens into the housing enclosure. A cross-flexure 21 is joined to the bracket through a fixed block 22 which is elevated from the face of the mounting plate. A floating block 23 is joined to the fixed block by flat springs 24, 25 so as to be suspended thereby. Both the fixed block and the floating block are substantially identical in shape. Each is a substantially rectangular block having wedge-shaped truncations in opposite parallel sides. The fixed and floating blocks are inverted with respect to each other so that the inclined surfaces of their respective truncations converge toward a common point. One flat spring is joined at opposite ends to the bottom inclined portion of the fixed block and the upper inclined portion of the floating block respectively. The other flat spring is oppositely joined so that a cross-flexure of two juxtaposed flat springs is obtained. Each of the flat springs is made as stiff and as light as possible by the proper selection of cross sectional area to minimize responses to vibration and acceleration. A mass 26 is joined to the floating block so that the mass and the floating block act together as a balancing mass. The center of gravity of this balancing mass and the center of gravity of the pressure capsule are on opposite sides of the crossing point of the flat springs forming the cross-flexure.

A support piece 27 is joined as by screws 27A to one side of the floating block. The support piece is a rectangular bar elevated from the mounting plate and extending parallel to it from the floating block to a point above the approximate center of the connector bore. A wiper arm support 28 formed from a sheet metal channel is joined, as by screws 28A, to a vertical side of the support piece and extends collinearly toward the edge of the mounting plate. A layer of electrical insulating material 29 separates the wiper arm support from the support piece. A wiper arm extension 30 comprising a pointer of sheet material is joined to the wiper arm support as a collinear extension. An electrical contact pad 31 is fixed to the end of the wiper arm extension.

A potentiometer bracket 32, formed in the shape of a square U from a massive block of material, is joined through one leg of the U to the mounting plate so that it is positioned adjacent the end of the wiper arm extension. A layer of the insulating material 33 separates the potentiometer bracket from the face of the mounting plate so that the effect of thermal transients is minimized. A resistance wire coil 34, wound on an anodized aluminum mandrel 35, is fixed normal to the surface of the mounting plate by joining the ends of the mandrel to opposite legs of the potentiometer bracket. The use of an anodized aluminum mandrel permits dissipation of heat from the coil even under vacuum conditions. The resistance wire coil is thereby positioned so that the contact pad affixed to the end of the wiper arm extension is held in slidable contact with the coil. Suitable electrical connections (not shown) to the ends of the resistance wire coil and to the wiper arm extension are made to provide a potentiometric system.

A force arm 36 is joined by screw 36A to the face of the end of the support piece projecting over the connector bore, as particularly shown in Fig. 3. At its other end the force rod is joined to the interior wall of the pressure responsive capsule. In this manner, deflections of the pressure capsule are transmitted to the wiper arm extension and produce a displacement of the electrical contact pad relative to the resistance wire coil. The crossing point of the flat springs of the cross-flexure is the pivot point for movements of the wiper arm system responsive to pressure-induced deflections of the capsule. Where, however, the mass of the pressure capsule is moved by a force, such as acceleration, which acts equally upon the balancing mass, the movement of the capsule acting to displace the wiper arm extension is counterbalanced by a movement of the balancing mass. Displacement of the contact pad relative to the resistance wire coil is thereby minimized. The position of the balancing mass with respect to the pivot point therefore acts together with the cross-flexure to provide a minimum response to acceleration and vibrational environments. In addition, excellent wiper arm linearity is achieved where pressure-induced deflections of the capsule occur.

A cover 37 is joined as by welding to the mounting plate so as to enclose the operative elements within the housing enclosure. This cover is utilized when the transducer is used to measure absolute pressures and provides a convenient means for forming a leakproof evacuatable inner chamber. When used as an absolute gage, the inner chamber formed by the cover and, as a result, the interior of the capsule, are evacuated and sealed.

Where used as a differential or gage transducer, cover 37 is not used. As a differential transducer, a second source of varying pressure and chamber 13 are connected through a pressure fitting (not shown) through the bore in the connector, this pressure acts upon the interior of the capsule. As previously described, a first source of varying pressure acts externally of the pressure capsule so that the capsule is subjected to a differential pressure.

With reference to Figs. 4 and 5 another embodiment of the cross-flexure for use in the transducer according to the invention is shown. A fixed block 40 is rigidly joined to a bracket 41. The bracket is joined to the mounting plate as described in conjunction with Fig. 1. A floating block 42 is suspended from the fixed block by flat springs 43, 44. The fixed block and the floating block are identical in structure to those described in conjunction with Figs. 1 and 2. As particularly shown in Fig. 5, each of the flat springs has an intermedial arcuate recess in one side. The ends of each spring have substantially the same width as the floating and fixed blocks. One end of spring 43 is joined to the bottom inclined surface of the fixed block and the other end is fixed to the top inclined surface of the floating block. Spring 44 is joined at its opposite ends to the top inclined surface of the fixed block and the bottom inclined surface of the floating block. By reason of the arcuate recess, the springs intermesh at a crossing point intermediate between the blocks. The principal advantage of this embodiment of the cross-flexure is that added structural strength is gained in that a maximum mating surface is utilized in joining the springs to the respective blocks. To avoid direct heating of the springs, pads 45 are placed over the portion of each spring mating with the blocks and spot welded to affix the springs to the blocks. The embodiment of the cross-flexure herein described acts to flexibly support the floating block and is joined to the wiper arm system to pivot it in the manner described in conjunction with the cross-flexure shown in Fig. 1.

It is apparent that modifications may be made in the embodiments of the pressure transducer of the invention described herein without departing from the basic concept of the invention. For example, a larger range of pressure measurement may be achieved through the use of a second pressure responsive capsule serially joined to the first pressure responsive capsule. In operation, the two pressure capsules respond in a manner identical to the action of the one previously described.

The pressure transducer according to the invention is particularly useful for sensitive control operations, particularly for inflight applications. A low vibration response is achieved consistent with a pivoting flexure system involving no sliding or wearing contact. In addition, the thermal response is low since the use of a mounting plate upon which all elements are mounted provides a temperature sink. Since the displacement sensing means is isolated from the medium to be measured, the actuating elements are contacted only by a reference medium or a substantially vacuum condition. In this manner, the life of the instrument is prolonged. These aspects of the transducer combine to make it particularly useful where structural configurations make access to control instrumentation difficult.

I claim:

1. A pressure sensing transducer comprising a housing, pressure responsive means mounted in the housing for displacement in response to pressure changes, displacement sensing means, a lever arm in displaceable relationship relative to the displacement sensing means, means operable to transmit a force to the lever arm responsive to displacement of the pressure responsive means, a pair of crossing springs connected at one end to rigid support means and at their opposite end to the lever arm to suspend the arm for pivoted movement in opposition to the supporting springs, and a balancing mass mounted at the pivoted end of the lever arm, the centers of gravity of the pressure responsive means and the balancing mass respectively being on opposite sides of the crossing point of the springs.

2. Apparatus in accordance with claim 1 wherein the springs are juxtaposed flat springs.

3. Apparatus in accordance with claim 1 wherein the springs are flat springs having a width substantially equal to the width of the support means and an intermediate recess on one side to permit interlacing of the springs at the crossing point.

4. Apparatus in accordance with claim 1 wherein the displacement sensing means is a potentiometer.

5. A pressure sensing transducer comprising a housing, a mounting plate having an axial bore fitted within the housing to form first and second chambers, a pressure responsive shell joined to the mounting plate within the first chamber whereby the bore interconnects the interior of the shell and the second chamber, displacement sensing means joined to the mounting plate within the second chamber, a lever arm in displaceable relationship relative to the displacement sensing means, a force arm passing through the bore and operable to transmit a force to the lever arm responsive to displacement of the pressure responsive shell, a pair of crossing springs connected at one end to support means on the mounting plate and at their opposite end to the lever arm to suspend the arm for pivoted movement in opposition to the supporting springs, and a balancing mass mounted at the pivoted end of the lever arm the centers of gravity of the pressure responsive shell and the balancing mass respectively being on opposite sides of the crossing point of the springs.

6. Apparatus in accordance with claim 5 wherein connecting means interconnect the first chamber and a source of varying pressure.

References Cited in the file of this patent

UNITED STATES PATENTS

| | | |
|---|---|---|
| 2,466,071 | Barnes et al. | Apr. 5, 1949 |
| 2,622,177 | Klose | Dec. 16, 1952 |
| 2,857,495 | Bourns et al. | Oct. 21, 1958 |